United States Patent
Kirikoshi et al.

(10) Patent No.: US 6,839,848 B1
(45) Date of Patent: Jan. 4, 2005

(54) INFORMATION PROCESSING SYSTEM AND PERIPHERAL APPARATUS

(75) Inventors: Hirohito Kirikoshi, Tokyo (JP); Makoto Ohara, Tokyo (JP); Nobuyuki Ishikawa, Musashino (JP)

(73) Assignee: Sega Enterprise, Ltd., Tokyo (JP)

( * ) Notice: Subject to any disclaimer, the term of this patent is extended or adjusted under 35 U.S.C. 154(b) by 0 days.

(21) Appl. No.: 09/374,129

(22) Filed: Aug. 9, 1999

(30) Foreign Application Priority Data

Aug. 7, 1998 (JP) .......................... 10-223834
Oct. 30, 1998 (JP) .......................... 10-309687

(51) Int. Cl.$^7$ .......................... G06F 11/30; G06F 12/14; H04L 9/00; H04L 9/32
(52) U.S. Cl. .......................... 713/200; 713/167
(58) Field of Search .......................... 713/200, 167

(56) References Cited

U.S. PATENT DOCUMENTS 5,119,293 A * 6/1992 Hammond .................... 705/24
5,243,174 A * 9/1993 Veeneman et al. .......... 235/381
5,343,524 A * 8/1994 Mu et al. ...................... 705/55
5,544,083 A * 8/1996 Iizuka et al. ................ 708/131

FOREIGN PATENT DOCUMENTS

JP          2560124          11/1991

OTHER PUBLICATIONS

Matsubara, Security system for Software, Nov. 1991, Japanese Patent Publication No. 3-266051.

* cited by examiner

Primary Examiner—Gilberto Barrón
Assistant Examiner—G. Gurshman
(74) Attorney, Agent, or Firm—Dickstein Shapiro Morin & Oshinsky LLP

(57) ABSTRACT

The present invention provides an information processing system, including an information processing apparatus for executing a program by reading a program recorded in a recording medium, and a peripheral apparatus connected to the information processing apparatus, wherein the peripheral apparatus stores a security code and operation of the peripheral apparatus stops unless the same security code as the security code recorded in a recording medium is sent from the information processing apparatus.

16 Claims, 7 Drawing Sheets

INFORMATION PROCESSING SYSTEM AND PERIPHERAL APPARATUS

BACKGROUND OF THE INVENTION

1. Field of the Invention

The present invention relates to an information processing system, including information processing apparatus (e.g. personal computer) and a peripheral apparatus, for executing computer programs, and more particularly to an information processing system having a security system which judges whether peripheral apparatus and a recording medium where a program is recorded are authorized.

2. Description of the Related Art

In the case of a conventional video game machine using a television as a display, the same security data is stored in a cartridge where a game program is recorded and in a video game machine main unit, and the video game machine main unit operates only when the security data coincide so as to prevent use of a cartridge where an unauthorized game program is recorded.

However, in the case of an information processing system, including a personal computer and a peripheral apparatus, for executing a game by the personal computer reading the program recorded in a recording medium, such as a CD-ROM, effectively preventing execution of a game stored in an unauthorized CD-ROM is not always easy since overwriting security data is easy.

Also the conventional security system for a recording medium, such as a CD-ROM, where a program is stored, executes the security check in the initial stage of executing a program after setting the recording medium to the personal computer. Therefore, if the initial security check is avoided by overwriting the security data, then the game can be freely executed.

SUMMARY OF THE INVENTION

It is accordingly an object of the present invention to provide an information processing system, including an information processing apparatus for executing a program (program for game, for example) by reading the program recorded in a recording medium, such as a CD-ROM, and a peripheral appa rat us connected to the information processing apparatus, wherein the information processing system has a security system which effectively prevents execution of a game using an unauthorized CD-ROM or another medium, and to provide peripheral apparatus and recording medium used for the information processing system.

To achieve the above object, the present invention provides an information processing system, including an information processing apparatus and a peripheral apparatus, for executing a program by the in formation processing apparatus reading a program recorded in a recording medium, such as a CD-ROM, wherein a custom IC (e.g. microcomputer with built-in ROM) required for the basic operation of peripheral apparatus stores a security code, and operation of the peripheral apparatus stops unless the same security code as the security code recorded in a recording medium is sent from the personal computer.

According to the present invention, the recording medium where the program is recorded cannot operate the peripheral apparatus unless the security code recorded in the recording medium coincides with the security code which has been stored in the peripheral apparatus. This makes it impossible to operate the peripheral apparatus from the recording medium side by avoiding the security function, and since the security code is built-in to the custom IC which is required for the basic operation of the peripheral apparatus, it is virtually impossible to modify the peripheral apparatus to delete the security function.

The above mentioned object is also achieved by providing a security check method for an information processing system including an information processing apparatus for reading out a program and first and fourth security codes recorded on a recording medium and executing a program and a peripheral apparatus which is detachably connected to the information processing apparatus and stores second and third security codes, comprising:

a first step, by the information processing apparatus, for reading the first security code from the recording medium and transmitting the first security code to the peripheral apparatus;

a second step, by the peripheral apparatus, for comparing the first security code transmitted from the information processing apparatus and the second security code to judge whether they coincide each other, transmitting the third security code to the information processing apparatus in the case when the judgement indicates coincidence and stopping signal processing in the case of incoincidence;

a third step, by the information processing apparatus, for comparing the third security code transmitted from the peripheral apparatus and the fourth security code to judge whether the security codes coincide each other and stopping execution of the program in the case of incoincidence.

In accordance with the present invention, in order to confirm whether the recording medium is authorized, the peripheral apparatus compares the first security code sent from the information processing apparatus and the second security code which has been set in the peripheral apparatus, and judges whether the security codes coincide each other.

Also, in order to confirm that the peripheral apparatus is authorized, the information processing apparatus compares the third security code sent from the peripheral apparatus and the fourth security code recorded in the recording medium, and judges whether the security codes coincide each other.

DESCRIPTION OF THE PREFERRED EMBODIMENTS

Embodiments of the present invention will now be described with reference to the accompanying drawings.

The technical scope of the present invention, however, is not restricted by these embodiments.

In the information processing system of an embodiment of the present invention, peripheral apparatus is connected to a personal computer, a CD-ROM where a program is recorded is set in a CD-ROM drive of the personal computer, and a picture book for a game, for example, is placed on a tablet of the peripheral apparatus to execute the program.

In this case, the peripheral apparatus of the present embodiment functions as a pen input device of the information processing system, and pictures and characters can be drawn on the display screen of the personal computer or a command of the program can be executed by moving the attached touch pen on the picture book for the game, for example.

Figure 1A:
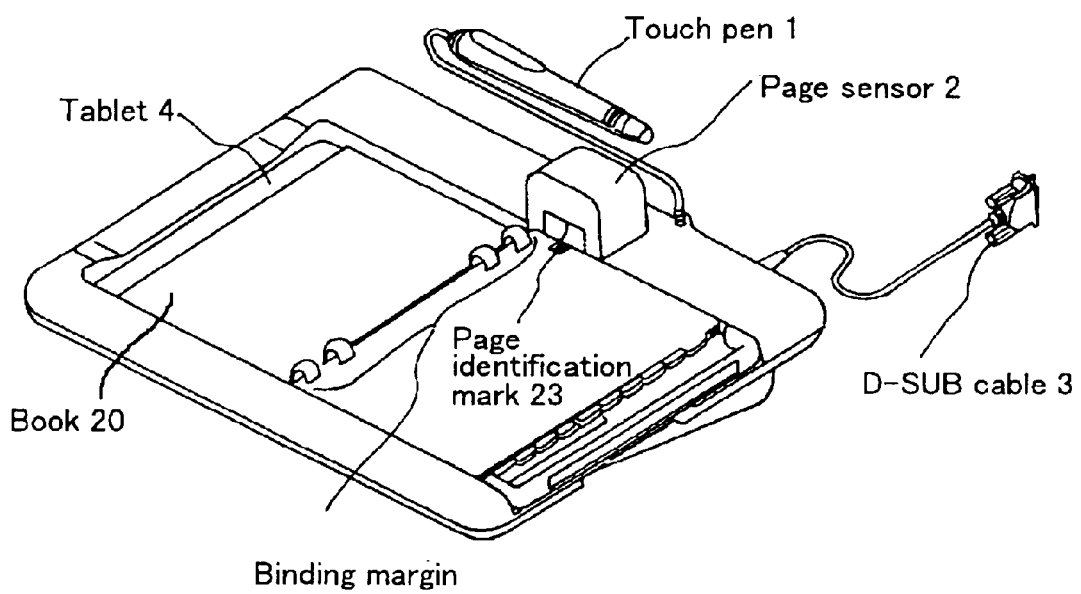
FIG. 1 is a schematic drawing depicting peripheral apparatus in accordance with the embodiment of the present invention.

At first, the peripheral apparatus of the information processing system in accordance with the embodiment of the present invention will be described with reference to the drawings. FIG. 1 is a schematic drawing depicting the peripheral apparatus of this embodiment. As FIG. 1(a) shows, the peripheral apparatus 10 of this embodiment comprises a tablet 4 where a book is placed, a page sensor for detecting the type and the page of the book, a touch pen 1 which is moved on the tablet 4 to move a cursor on the display screen of the personal computer and a D-SUB cable 3 for connecting the peripheral apparatus to the serial communication port of the personal computer.

Figure 1B:
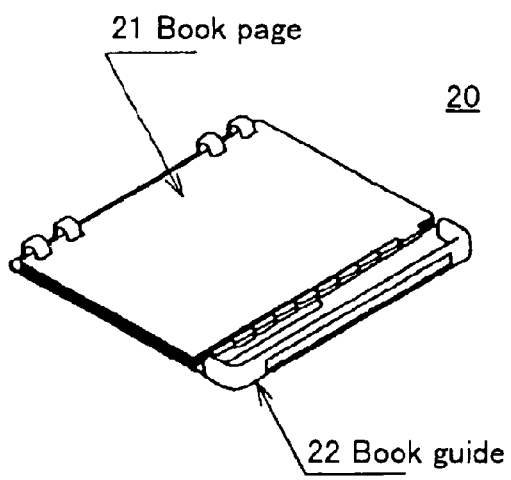

FIG. 1(b) is a schematic drawing of a book 20 which is used for the information processing system in accordance with the embodiment of the present invention. The book is, for example, a picture book. The book 20 has a book guide 22 made from ABS resin or other material, and book pages 21 where pictures are drawn according to the game program. FIG. 1(b) shows the state where the book 20 is closed, and the book 20 in this state is placed at the right of the tablet 4 of the peripheral apparatus 10. An identification mark indicating the type of book (e.g. barcode) is printed on the front cover of the book 20 for the page sensor 2 to detect the type of the book 20. An identification mark 23 indicating the page number (e.g. barcode, see FIG. 1(a)) is printed on each page of the book 20, so that the page sensor 2 can also detect the page of the book 20.

In the embodiment of the present invention, the page sensor 2 is a camera device which takes images of a predetermined page identification mark 23 (e.g. barcode) printed on the book 20 placed on the tablet 4. Then the personal computer executes image recognition processing for the image of the page identification mark so as to detect the page. The page detection method will be described later.

In the information processing system in accordance with the embodiment of the present invention, a D-SUB cable 3 of the peripheral apparatus 10 is connected to the serial communication port of the personal computer, a CD-ROM where a program is stored is set to the CD-ROM drive of the personal computer, and the book 20 is placed on the tablet 4 of the peripheral apparatus 10 to execute the program. When an animal, for example, which is drawn on the book page 21 is specified by the touch pen 1 while looking at the screen of the display of the personal computer, the animal dances and sings on the screen of the display to make the game fun.

Figure 2:
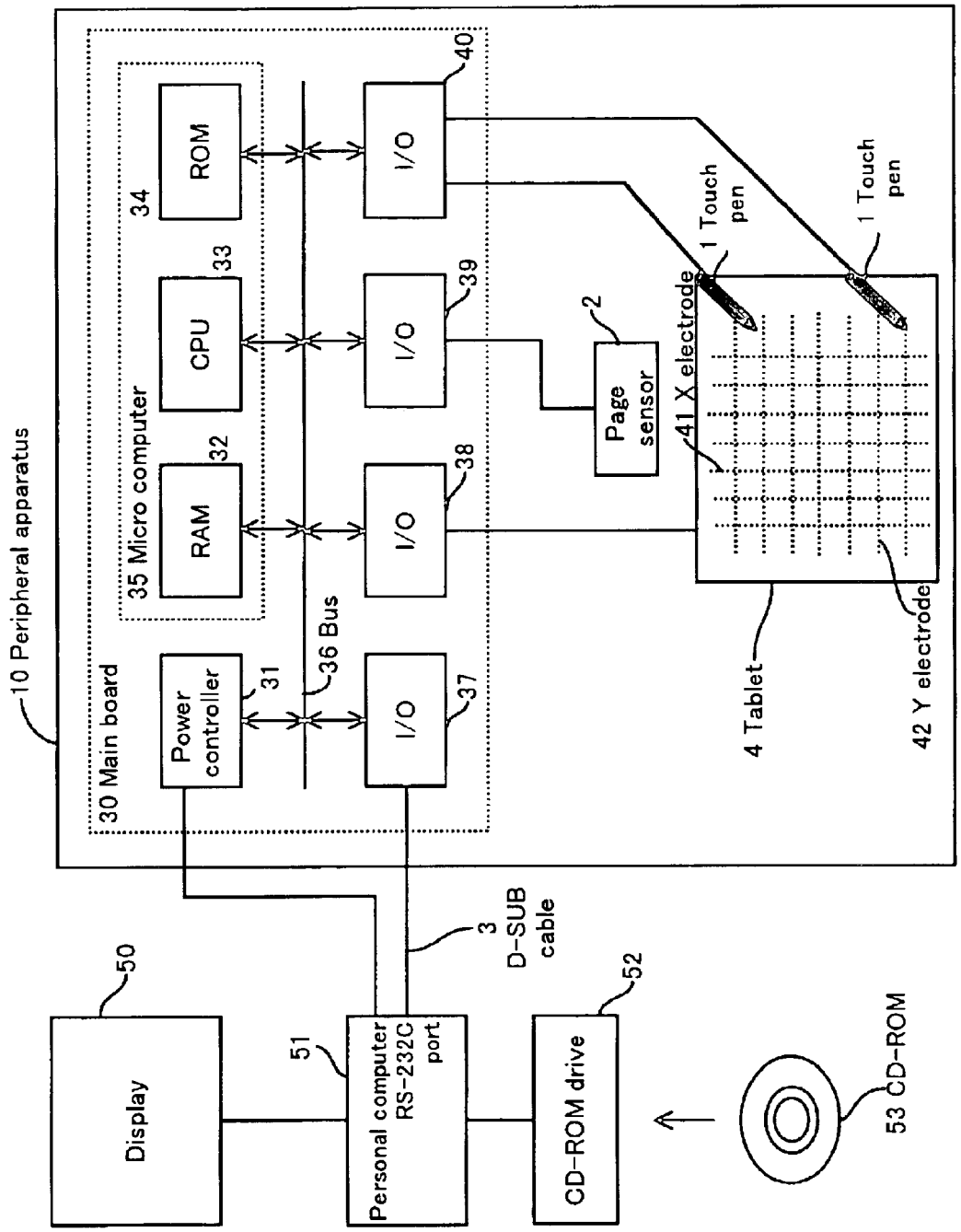
FIG. 2 is a block diagram depicting an information processing system in accordance with the embodiment of the present invention.

FIG. 2 is a block diagram depicting the information processing system in accordance with the embodiment of the present invention. The information processing system in accordance with the embodiment of the present invention comprises the personal computer 51, a CD-ROM drive 52 for setting a CD-ROM 53 where a program is stored, a display 50 for displaying a screen of a game, peripheral apparatus 10 which is connected to the personal computer 51 for inputting data by the touch pen 1, and a D-SUB cable 3 for connecting the personal computer 51 and the peripheral apparatus 10.

The peripheral apparatus 10 comprises a main board 30 where a microcomputer 35 and other components are mounted, a touch pen 1, a page sensor 2, and a tablet 4. A game is executed by placing the above mentioned book 20 on the tablet 4 and 11 operating the touch pen 1.

The main board 30 comprises a CPU 33, a microcomputer 35 which includes a mask ROM and a RAM 32, which is a temporary storage, and other devices, an input/output interface 40 for the touch pen 1, an input/output interface 39 for the page sensor 2, an input/output interface 38 for the tablet 4, an input/output interface 37 to be connected to the RS-232C port of the personal computer 51, a power controller 31 and an internal bus 36.

Power may be supplied from the personal computer 51 to the power controller 31 as illustrated, or may be supplied from a dedicated external power supply to the peripheral apparatus 10. The power controller 31 supplies necessary power to each unit of the peripheral apparatus 10, and outputs power on signal to the CPU 33 via the internal bus 36.

In the tablet 4, X electrodes 41 and Y electrodes 42 for emitting weak radio waves are disposed in a matrix. The X electrode 41 and Y electrode 42 are sequentially scanned via the interface 38 to emit the weak radio waves. The touch pen 1 operates as an antenna for receiving the weak radio waves, and outputs reception signals to the interface 40. Therefore, the position of the touch pen 1 on the tablet 4 can be detected by timing when the X electrode 41 and the Y electrode 42 are scanned, and by timing when the touch pen 1 receives radio waves. The tip of the touch pen 1 is a switch, so that various instructions can be defined by pressing the tip of the touch pen to the book 20 which is placed on the table section 4.

Next a security check to be executed by the information processing system in accordance with the embodiment of the present invention will be explained. When the power of the personal computer 51 is turned ON, a predetermined voltage is supplied to the power controller 31 of the peripheral apparatus 10, and the peripheral apparatus 10 waits for the reception of a security code which is sent from the personal computer 51.

When the power of the personal computer 51 is turned ON, the operating system starts up, and when a CD-ROM 53 where a program is stored is set to the CD-ROM drive 52, the security check begins.

In the CD-ROM 53, a security code consisting of predetermined characters has been stored, and the personal computer 51 transmits the security code to the peripheral apparatus 10 from the RS-232C port.

When the interface 37 of the peripheral apparatus 10 receives the security code, the security code is temporarily stored in the RAM 32 via the internal bus 36. Then the CPU 33 of the microcomputer 35 checks whether the security code stored in the mask ROM 34 and the security code temporarily stored in the RAM 32 coincide each other.

If the security codes are the same at this time, the peripheral apparatus 10 confirms that the CD-ROM 53 is authorized, and the CPU 33 transmits the security code to the personal computer 51 via the interface 37. If the security code transmitted from the peripheral apparatus 10 and the security code stored in the CD-ROM 53 are the same, the personal computer 51 confirms that the peripheral apparatus 10 is authorized.

If the security code stored in the mask ROM 34 is not the same as the security code temporarily stored in the RAM 32, on the other hand, the CPU 33 stops operation of the peripheral apparatus 10 without executing subsequent processing. If the security code transmitted from the peripheral apparatus 10 is not the same as the security code stored in the CD-ROM 5.3, the personal computer 51 stops execution of the program. In this way, execution of the program by the unauthorized CD-ROM 53 or peripheral apparatus 10 can be effectively prevented.

In the information processing system in accordance with the embodiment of the present invention, a security check is executed not only at the startup of the program but also at each predetermined time during execution of the program, therefore switching the CD-ROM with an unauthorized one during execution of the program can be prevented, and as a result, the reliability of a security check further improves.

Figure 3:
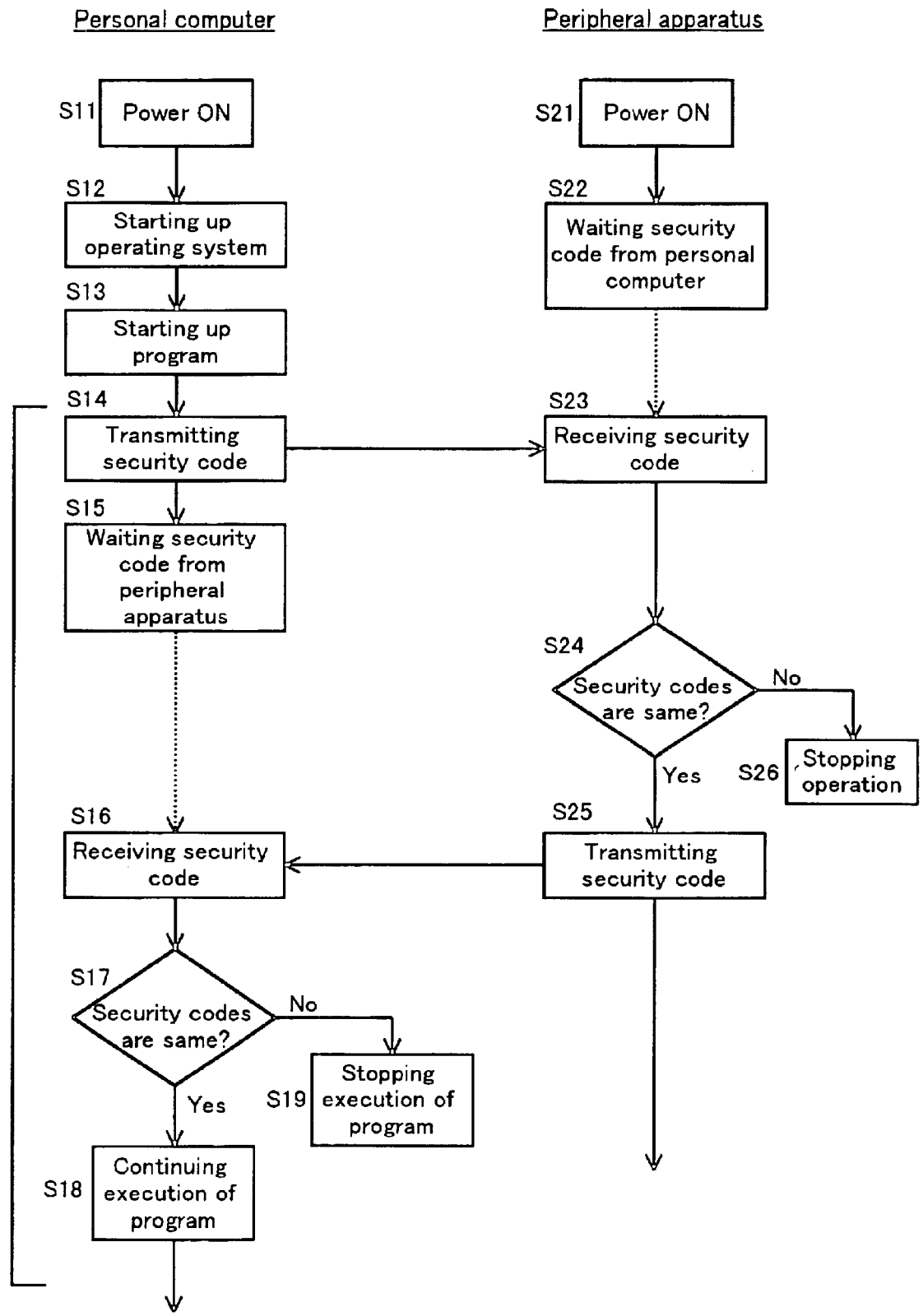
FIG. 3 is a flow chart on security clearing processing at startup in the information processing system in accordance with the embodiment of the present invention.

FIG. 3 is a flow chart depicting security clearing processing at startup in the information processing system in accordance with the embodiment of the present invention. The security check at startup will be explained according to this flow chart.

When the power of the personal computer and the power of the peripheral apparatus are turned ON (S11, S21), the security check at startup begins. The power ON of the peripheral apparatus may be interlocked with the power ON of the personal computer, or power may be supplied to the peripheral apparatus from a dedicated external power supply.

When power of the personal computer is turned ON, the operating system starts up (512), and thereafter an application software can be executed. If a CD-ROM of this embodiment where a program has been recorded is set to the CD-ROM drive of the personal-computer in this state, the program starts up (S13). When the power of the peripheral apparatus is turned ON, the peripheral apparatus waits for reception of a security code which is transmitted from the personal computer (S22).

Then the personal computer reads the first security code stored in the CD-ROM, and transmits the security code to the peripheral apparatus (S14). The first security code is made of at least one specific 1 byte character or symbol in ASCII or JIS code, for example, characters 'S', 'E', 'G' and 'A' chained in order of 'SEGA' with a predetermined blank period added between the characters.

The first security code is transmitted from the serial communication port, RS-232C for example, of the personal computer, and is received by the RS-232C interface unit of the peripheral apparatus (S23). The first security code received by the peripheral apparatus is temporarily stored in the RAM memory, for example, on the main board via the internal bus.

Then the peripheral apparatus judges whether the received first security code is the same as the second security code stored in the mask ROM of the microcomputer (S24). In other words, the CPU of the microcomputer judges whether the first security code temporarily stored in the RAM coincides with the second security code, 'S', 'E', 'G', 'A' for example, stored in the mask ROM.

If the received first security code is not the same as the second security code stored in the mask ROM (NO), then the peripheral apparatus stops operation (S26), and does not execute any subsequent processing. If the received first security code is the same as the second security code stored in the mask ROM (YES), on the other hand, the peripheral apparatus confirms that the CD-ROM where the first security code has been recorded is authorized, and transmits the third security code stored in the mask ROM to the personal computer (S25).

After the personal computer transmits the first security code in Step 14, the personal computer waits for reception of the third security code transmitted from the peripheral apparatus (S15). When the personal computer receives the third security code transmitted from the peripheral apparatus in this state (Sl6), the personal computer judges whether the received third security code is the same as the fourth security code stored in the CD-ROM (S17).

If the received third security code is not the same as the fourth security code stored in the CD-ROM at this time (NO), the personal computer stops execution of the program (S19). If the received third security code is the same as the fourth security code stored in the CD-ROM (YES), on the other hand, the personal computer confirms that the peripheral apparatus is authorized, and continues execution of the program (S18).

The security clearing processing at startup now ends. The third security code stored in the peripheral apparatus may be the same as the second security code, and the fourth security code recorded in a recording medium may be the same as the first security code.

In this way, in the information processing system of the present embodiment, the security check is executed by both the peripheral apparatus and the personal computer, and if the security codes are not the same, the operation of the peripheral apparatus stops to stop execution of the program, which improves the reliability of security.

After the above described security clearing processing at startup, a request for data from the personal computer to the peripheral apparatus and a reply to the request from the peripheral apparatus to the personal computer are repeated. In the information system of the present embodiment, the security code confirmation processing interrupts at each predetermined time, several seconds to several tens of seconds for example, during execution of the program, so as to improve reliability of security. Therefore switching the CD-ROM with an unauthorized one during execution of the program and executing another program recorded in the unauthorized CD-ROM can be prevented.

Figure 4:
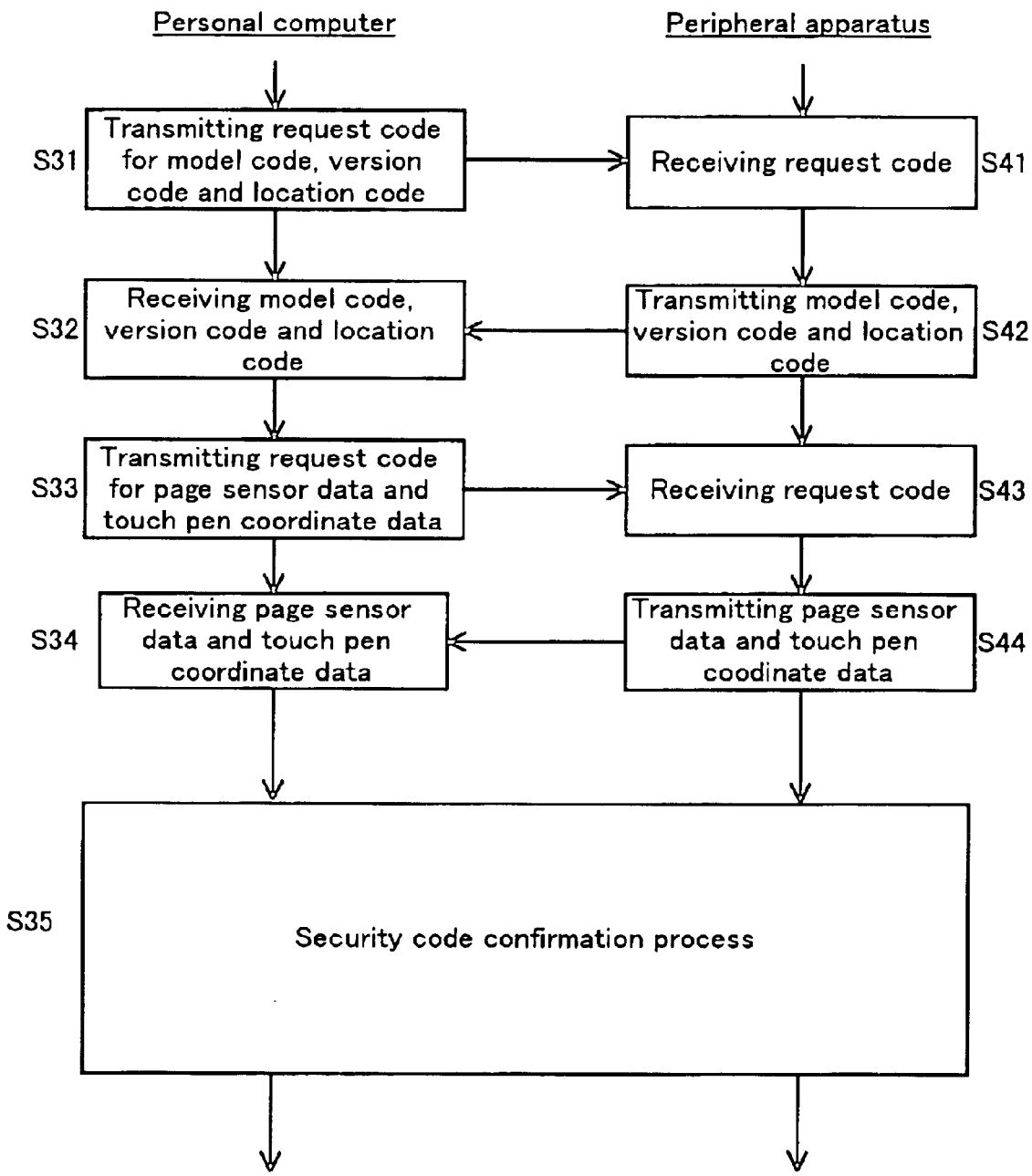
FIG. 4 is a flow chart depicting the security code confirmation processing during operation in the information processing system in accordance with the embodiment of the present invention.

FIG. 4 is a flow chart depicting the security code confirmation processing during execution of a program in the information processing system in accordance with the embodiment of the present invention. After security clearing processing at startup, the personal computer first transmits a request code for a model code, version code and location code (S31). The model code is a code to specify the model of the peripheral apparatus, by which the personal computer judges the peripheral apparatus to be connected and the appropriate program to be executed.

The version code is added when the functions of the peripheral apparatus are changed due to an update. The location code specifies a location where the apparatus is used, such as Japan or overseas, for selecting the language to be used for a game, and for changing the standard voltage depending on the power supply voltage of the location.

When the peripheral apparatus receives a request code from the personal computer (S41), the peripheral apparatus returns its model code, version code and location code to the personal computer (S42). When the personal computer receives the codes from the peripheral apparatus (S32), the personal computer executes a program corresponding to the codes.

The personal computer also transmits a request code for page sensor data and touch pen coordinate data to the peripheral apparatus (S33). The page sensor data indicates the type and page of the book to be used for the game, which is detected by the page sensor of the peripheral apparatus. The touch pen coordinate data indicates the position of the touch pen on the tablet.

When the peripheral apparatus receives the request code, such as for page sensor data (S43), the peripheral apparatus returns data for the request (S44), and the peripheral computer receives the data (S34).

In this way, the personal computer and the peripheral apparatus communicate data to execute the program, and in the information processing system of the present embodiment, a security code confirmation process interrupts at each predetermined time during execution of the program (35).

The security code confirmation processing during execution of the program is the same as the processing in steps S14–S19 and S23–S26 in the security clearing processing at startup, shown in FIG. 3.

In this way, in the information processing system in accordance with the embodiment of the present invention, the security code confirmation process is executed at each predetermined time, even after security clearing at power ON. Therefore, if the CD-ROM is switched with an unauthorized one which stores another program during execution of a program, the peripheral apparatus stops operation to further improve the security of the information processing system.

In the information processing system in accordance with the embodiment of the present invention, a communication system, with a fixed communication speed, data length and parity type is used at startup for a security check. A security check to be executed during execution of a program, however, can be executed at the communication speed being used at that point.

Figure 5:
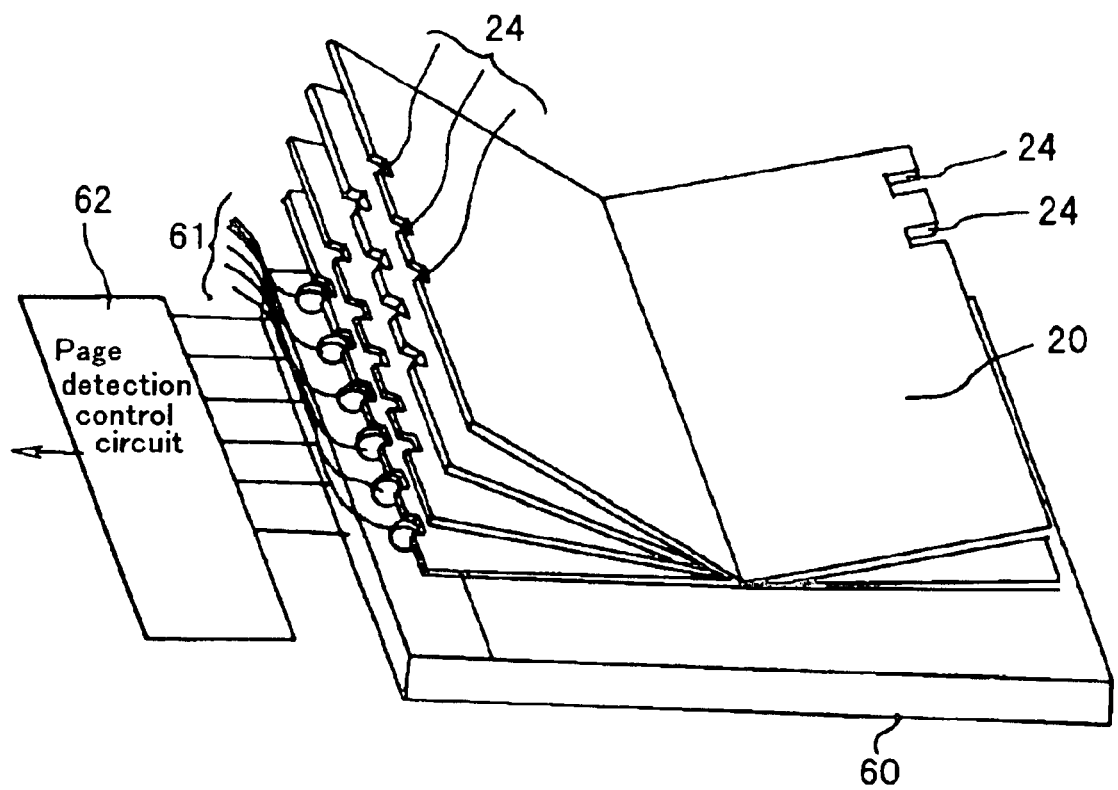
FIG. 5 is a drawing depicting a conventional page detection method.

Next the page detection method of the embodiment of the present invention will be explained. FIG. 5 is a drawing depicting a conventional page detection method. Optical sensors 61 for the number of pages of the book 20 are disposed at the vertical edge of a stand 60 where the book 20 is placed. The optical sensor 61 detects the reflected light of the light which the optical sensor 61 emits. At the vertical edge of each page of the book 20, on the other hand, a concave portion 24 is created sequentially. When the top of the optical sensor 61 is not blocked due to the concave portion 24, the light from the optical sensor 61 is not reflected but transmits, so the optical sensor 61 does not detect the reflected light. When the top of the optical sensor 61 is covered by a page of the book, light from the optical sensor 61 is reflected by the page of the book 20, so the optical sensor 61 detects the reflected light. The page detection control circuit 62 detects the page number of the page which is open at this time according to the number assigned to the optical sensor 61 which detected the reflected light.

With such a page detection method, however, the same number of optical sensors as the number of pages are required, which makes it difficult to increase the number of pages of a book. This limits the number of pages of a book to 7 or 8. Also the edges of a page tend to roll up, and when this occurs, light from the optical sensor transmits even if the light should be reflected, which makes it possible to cause a page number detection error.

The page detection method of the embodiment of the present invention can solve these problems, can detect page numbers regardless the number of pages of a book, and rarely causes a page detection error.

Figure 6:
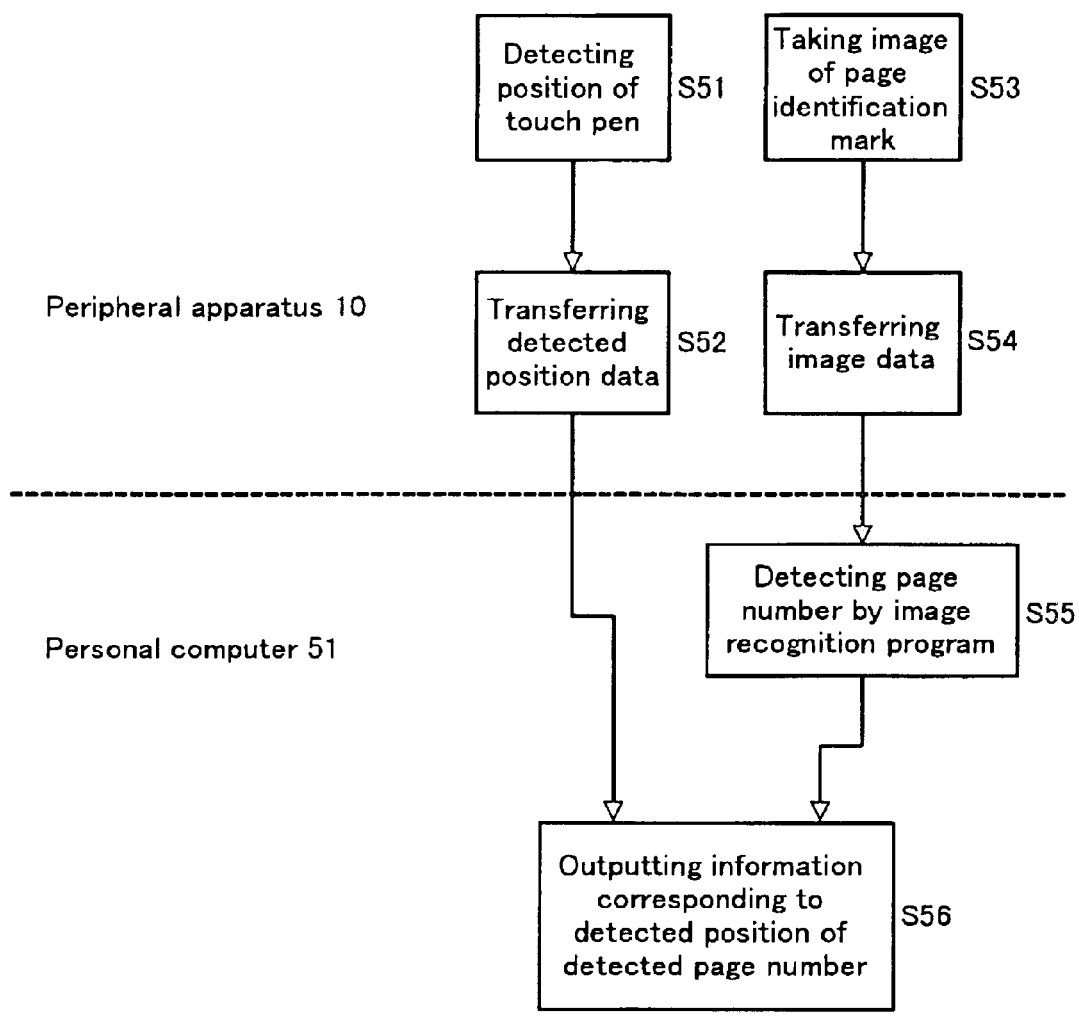
FIG. 6 is a flow chart depicting a page detection method in accordance with the embodiment of the present invention.

FIG. 6 is a flow chart depicting the processing of the page detection method in accordance with the embodiment of the present invention. In Step 51, the peripheral apparatus 10 detects the position of the touch pen 1, and transfers the detected position data to the personal computer 51 (Step S52). The peripheral apparatus 10 takes the image of the page identification mark 23 printed on the placed book 20 by the page sensor 2, which is a camera device (Step S53), and transfers the image data to the personal computer 51 (Step 54).

The personal computer 51 executes image recognition processing on the received image data by an image recognition program, and detects the page number (Step S55). Based on the page number detected in this manner and on the received detected position data, the personal computer 51 outputs the information (e.g. image data) corresponding to the detected position of the detected page number to the display 50 (Step S56).

As FIG. 1(a) shows, in the embodiment of the present invention, the page sensor 2 is disposed next to a binding margin (center portion of the opened book 20) at the top end of the book 20 placed on the tablet 4, and the page identification mark 23 for identifying the page number of the book 20 is printed around the binding margin at the top end of the book. The page identification mark 23 may be a numeral character of the page number or may be a specific symbol or a graphic, such as a barcode. As described above, in the embodiment of the present invention, the page identification mark 23 is not located at the left or right edge where the page may roll up, but is printed near the binding margin of the top end of the book. Therefore, the page detection problem, due to a page rolling up which makes taking the image of the page identification mark 23 impossible, can be prevented.

Figure 7:
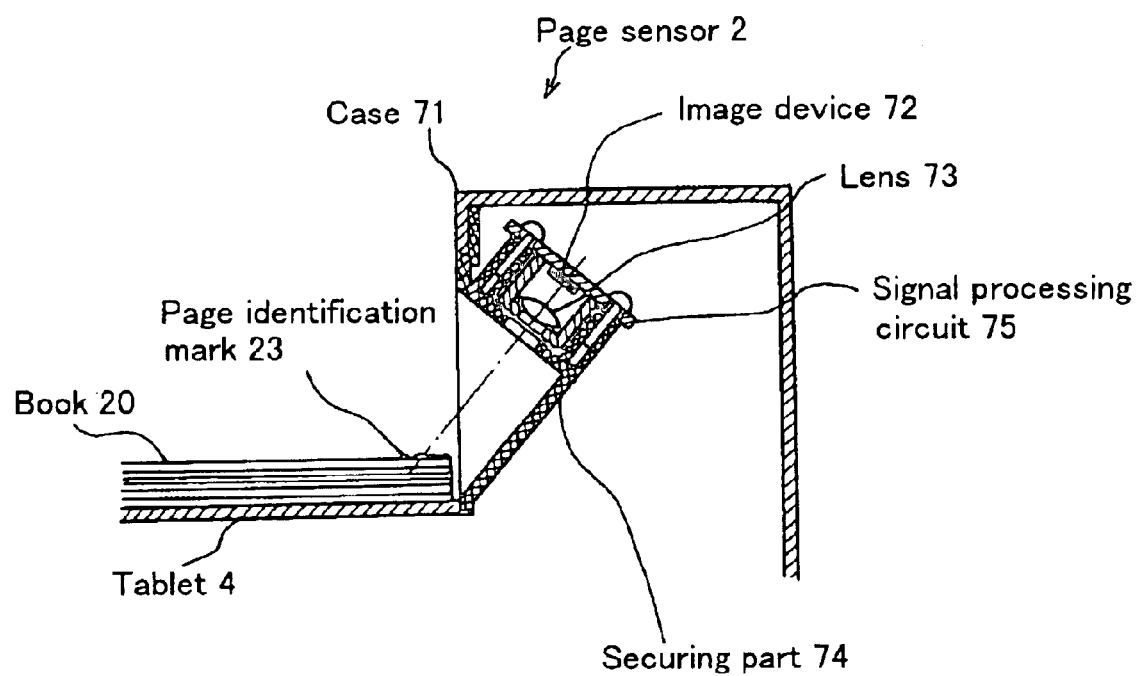
FIG. 7 is a cross-sectional view of a page sensor 2.

FIG. 7 is a cross-sectional view of the page sensor 2. In FIG. 7, the page sensor 2 has a two-dimensional image device (area sensor) 72 in the case 71, and the image device 72 is fixed at a position which is outside the book 20 and is above the center area of the top end of the book 20 in the height direction by a securing unit 74. Therefore, the image device 72 of the embodiment of the present invention does not interrupt turning the pages of the book.

The image device 72 takes the image of the page identification mark 23, which is printed around the binding margin at the top end of the book 20 via the lens 73. The image device 72 is, for example, an artificial retinal device, a CCD (charge coupled device) or an MOS type image device. The lens 73 may be one lens or a plurality of lenses. The page sensor 2 may have an auto focusing function, and in this case, the focal point of image can be accurately adjusted even if the thickness of the book changes depending on the page number. Also, even if the lens 73 is a single focus lens, an out of focus image can be corrected by software processing. The image signals taken by the image device 72 are read by the signal processing circuit 75, and are transferred to the personal computer 51 as image data.

To detect the page number, the personal computer 51 executes a predetermined image recognition program for the received image data. This image recognition program operates on the same principal as commonly used OCR (optical character recognition) software, for example. In other words, the CPU of the personal computer 51 compares the received image data with the image patterns for all pages numbers which have been programmed into the image recognition program, and searches an image pattern which matches with the image data.

Based on the page number detected in this manner and on the position on the tablet 4 instructed by the touch pen 1, the CPU of the personal computer 51 executes the image processing program appropriate for the book, and controls so as to display a predetermined image on the display 50.

The page identification mark 23 printed around the binding margin at the top end of the book 20 is not restricted to a page number, but may be a symbol or graphic, such as a barcode. Barcodes in particular are more effective than such numerals as page numbers for the following reasons. When the image of a numeral page number is taken as the page identification mark 23, for example, image signal processing is necessary for all two-dimensional image data which was taken to detect the numeral. In the case of a barcode, which has the same patterns in different degrees of darkness in vertical or horizontal directions, the dark pattern can be recognized only by several lines (at least one line) of the image data crossing the barcode, not all of the two-dimensional image data which was taken. In other words, the signal processing circuit 35 transfers several lines of image data to the personal computer 51, and the personal computer 51 executes image recognition for this several lines of image data. This considerably decreases the image processing volume, the transfer time of the image data, and the image data volume used for comparison at image data detection, and as a result page detection speed improves. Also the dark patterns of barcode image data is relatively simpler than such image data as numerals, therefore a comparison between image data and image pattern becomes relatively easy, and the possibility of recognition error in image recognition processing can be considerably decreased.

The peripheral apparatus of the above mentioned page detection method of the embodiment of the present invention need not have the tablet function. In other words, the stand of the peripheral apparatus where a book is placed may be a regular stand without a tablet function. If a regular stand is used, an image processing program is executed based on the page number of the book which is detected in the same manner as above.

For example, the book to be placed on a regular stand may be a novel, and a scene from the story corresponding to the detected page number is displayed on the screen. The book to be placed on the regular stand may also be a collection of problems used for study, where choices of possible answers corresponding to the detected page number are displayed on the screen.

In the above mentioned embodiment of the present invention, the personal computer executes software processing by the image recognition program, and detects the page number by executing image recognition for the taken image, but it is also possible that the image recognition program be stored in the ROM of the main board 30 of the peripheral apparatus 10, where the CPU 33 of the main board 30 executes image recognition for the image data of the taken page identification mark so as to detect the page number, and to output the corresponding information. In other words, the peripheral apparatus 10 may be independent electronic apparatus which detects a page number. This electronic apparatus may be connected to the personal computer or may be used as a standalone device.

When the page identification mark is a barcode, as mentioned above, image recognition may be executed based on several lines (at least one line) of image data among the taken image data.

The present invention, as described above, can provide an information processing system, including a personal computer and a peripheral apparatus, for executing a program by the personal computer reading the program recorded in a recording medium, such as a CD-ROM, wherein the security of the information processing system has been improved by effectively preventing the execution of a program by an unauthorized CD-ROM or other medium, and the peripheral apparatus and the recording medium used for the information processing system.

According to the page detection method of the present invention, the image of a mark for identifying the page number of a book placed on a stand is taken by a image device, and the page number is detected by executing image recognition processing for the taken image. This makes it possible to detect page numbers regardless the number of pages of a book.

In the page detection of the present invention, the image device used to take the image of a page identification mark is disposed outside the book and above the binding margin (center portion) at the top end of the book in the height direction in a state where the book is placed on the stand. Because of this, the image device does not interrupt turning the pages of the book. Also the page identification mark is printed around the binding margin at the top end of the book, therefore the portion of the page identification mark will not be rolled up and page detection becomes accurate.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A manipulation apparatus for use with an information processing apparatus, wherein said information processing apparatus comprises a first interface means to which said manipulation apparatus is detachably connectable and a second interface means to which a recording medium is detachably mountable and is constructed so as to execute a program read from the recording medium in response to an instruction that is transmitted from and indicative of a manipulative operation on, the manipulation apparatus, said manipulation apparatus comprising:

an input/output interface detachably connectable to said information processing apparatus;

a manipulative input means which transmits data indicative of said manipulative operation in response to the manipulative operation on the manipulation apparatus to the information processing apparatus;

read-only memory means inerasably stored with a first security code; and a control means comprising:

comparison means which compares the first security code with a second security code, said second security code being read from said recording medium into said information processing apparatus and supplied from said information processing apparatus to the manipulation apparatus; and operation control means which transmits confirmation data to the information processing apparatus when the codes coincide with each other, and which stops the operation of the manipulation apparatus or transmits to said information processing apparatus an instruction in response to which said information processing apparatus stops the execution of the program read from the recording medium when said first security code and said second security code do not coincide with each other, whereby a judgment is made as to whether said recording medium is authentic with respect to the manipulation apparatus.

2. A manipulation apparatus for use with an information processing apparatus, wherein said information processing apparatus comprises a first interface means to which said manipulation apparatus is detachably connectable and a second interface means from which an application program is read into said information processing apparatus and is constructed so as to execute the application program recorded on a detachably coupled recording medium in response to an instruction that is transmitted from, and indicative of manipulative operation on, the manipulation apparatus, said manipulation apparatus comprising:

an input/output interface detachably connectable to said information processing apparatus;

a manipulative input means which transmits data indicative of said manipulative operation in response to the manipulation operation on the manipulation apparatus to the information processing apparatus;

read-only memory means inerasably stored with a first security code; and a control means comprising:

comparison means which compares the first security code with a second security code related to said application program, said second security code being read together with said application program into said information processing apparatus and supplied from said information processing apparatus to said manipulation apparatus; and operation control means which transmits confirmation data to the information processing apparatus when the first and second security codes coincide with each other, and which stops the operation of the manipulation apparatus or transmits to said information processing apparatus an instruction in response to which said information processing apparatus stops the execution of the application program when said first and second security codes do not coincide with each other, whereby a judgment is made as to whether said application program is authentic with respect to said manipulation apparatus.

3. The manipulation apparatus according to claim 1, wherein said read-only memory means further inerasably stores a third security code, wherein said operation control means transmits said third security code to said information processing apparatus when said first security code and said second security code coincide with each other, said third security code transmitted to said information processing apparatus being compared on the information processing apparatus with a fourth security code that is read from said recording medium into the information processing apparatus.

4. The manipulation apparatus according to claim 1, said manipulative input means further comprising:

a tablet having X and Y matrix electrodes for emitting radio waves;

a pen type object having an antenna for receiving the radio waves emitted from said matrix electrodes and a switch; and a page sensor for detecting a page of a picture book placed on said tablet, wherein an instruction in response to which said program is executed on the information processing apparatus is defined by positioning said pen type object at a predetermined location in said picture book placed on said tablet.

5. An information processing system comprising:

an information processing apparatus provided with:

a first interface means; and a second interface means to which a recording medium is detachably mountable, said recording medium being stored with an application program executable on said information processing apparatus and a first security code; and a manipulation apparatus detachably connectable to said first interface means of said information processing apparatus and provided with:

control means that transmits data to the information processing apparatus in response to a manipulative input operation on the manipulation apparatus, wherein said information processing apparatus executes the program in response to the transmitted data;

a read-only memory means inerasably stored with a second security code; and a signal processing means which compares the second security code with said first security code which the information processing apparatus reads from said recording medium and transmits to said manipulation apparatus, and transmits confirmation data to said information processing apparatus when the first security code coincides with the second security code thereby to make a judgment of authenticity between the application program read from said recording medium and said manipulation apparatus, or stops signal processing for said information processing apparatus when the first security code does not coincide with the second code.

6. The information processing system according to claim 5, wherein said read-only memory means on said manipulation apparatus further inerasably stores a third security code wherein a fourth security code is recorded in said recording medium and read into said information processing apparatus, wherein said manipulation apparatus transmits said third security code to said information processing apparatus if said judgment indicates coincidence between said first and second security codes, wherein said information processing apparatus compares said third security code transmitted from said peripheral apparatus and said fourth security code to make a judgment as to whether or not the program read out from said recording medium is authentic in respect of said manipulation apparatus based on whether the codes coincide with each other or not, and stops the execution of said program if said judgment indicates incoincidence.

7. The information processing system according to claim 6, wherein said third security code is the same as said second security code, and said fourth security code is the same as said first security code.

8. An information processing method for an information system wherein an information processing apparatus executes a program, in response to manipulation signals transmitted from a manipulation apparatus, said manipulation signals being generated in response to a manipulative input operation on the manipulation apparatus, said method comprising the steps of:

reading an application program and a first security code stored in a recording medium into the information processing apparatus when the recording medium is coupled to said information processing apparatus;

supplying the first security code from the information processing apparatus to said peripheral manipulation apparatus;

comparing a second security code, which is inerasably stored in advance in a read-only memory means built in said manipulation apparatus, with said first security code, the step of comparing being performed on said manipulation apparatus;

transmitting confirmation data signals from the manipulation apparatus to the information processing apparatus when the first security code coincides with the second security code thereby to judge authenticity between said application program and said peripheral apparatus; and discontinuing the signal processing by the manipulation apparatus for said information processing apparatus when said first security code and said second security code do not coincide with each other.

9. The information processing method according to claim 8, wherein a third security code is inerasably stored in advance in a read-only memory means built in said manipulation apparatus and a fourth security code is stored in advance in said recording medium, the method further comprising the steps of:

transmitting the third security code from said manipulation apparatus to said information processing apparatus when said first security code and said second security code coincide with each other; and comparing said third security code with the fourth security code read out from the recording medium, the step of comparing being performed on said information processing apparatus.

10. The information processing method according to claim 9, further comprising the step of continuing execution of said program on said information processing apparatus when said third security code and said fourth security code coincide with each other.

11. The information processing method according to claim 10, wherein said third security code is the same as said second security code, and said fourth said code is the same as said first security code.

12. The information processing method according to claim 8, wherein the the step of said supplying of the first security code and the step of comparing of the second security code with the first security code are executed at predetermined time intervals during the execution of said program.

13. A recording medium stored with an application program which is executable on an information processing apparatus in response to a manipulative input operation by a user on a manipulation apparatus, wherein said recording medium is stored with an application program and a first security code and when the recording medium is detachably coupled to the information processing apparatus an authenticity verification method according to claim 8 is executed on said manipulation apparatus so that a judgment is made as to whether or not the application program is authentic with respect to the manipulation apparatus.

14. The recording medium according to claim 13, wherein a third security code is inerasably stored in advance in a read-only memory means built in said manipulation apparatus and a fourth security code is stored in advance in said recording medium, said authenticity verification method further comprising the steps of:

transmitting the third security code from the manipulation apparatus to said information processing apparatus when said first security code and said second security code coincide with each other, and comparing said fourth security code in the information processing apparatus with the third security code that is supplied to the information processing apparatus from the manipulation apparatus.

15. The recording medium according to claim 14, wherein said third security code is the same as said first security code, and said fourth security code is the same as said second security code.

16. The recording medium according to claim 14, wherein at least one of said second security code and said fourth security code are read by said information processing apparatus at predetermined time intervals during the execution of said application program.

* * * * *